Patented Sept. 5, 1950

2,521,287

UNITED STATES PATENT OFFICE 2,521,287

PROCESS FOR THE PRODUCTION OF QUINOXALINE

Michael N. Dvornikoff, St. Louis, Mo., assignor to Monsanto Chemical Company, St. Louis, Mo., a corporation of Delaware No Drawing. Application November 13, 1948, Serial No. 59,991

7 Claims. (Cl. 260—250)

This invention relates to quinoxaline. More particularly this invention relates to an improvement in the process for the production of quinoxaline.

Heretofore quinoxaline has been prepared by the reaction of glyoxal or preferably glyoxal sodium bisulfite with ortho-phenylene diamine in an aqueous medium. In such a process, unless very dilute suspensions or solutions of ortho-phenylene diamine are used, polymeric substances are formed in the reaction and the yield of quinoxaline is quite low.

It is an object of this invention to provide an improved process for the production of quinoxaline.

It is a further object of this invention to provide an improved process for the production of quinoxaline wherein a high concentration of reactants may be maintained and the quinoxaline obtained in high yield and purity thereby rendering the process commercially and economically practical.

Other objects will become apparent from the description of the novel process and the claims.

It has been found that quinoxaline may be conveniently obtained in high yield and purity by reacting ortho-phenylene diamine with glyoxal in an aqueous alkaline medium. It is essential, in the novel process of this invention, that the reaction mixture be alkaline initially and throughout the reaction time. It has further been found that under such alkaline conditions, high concentrations of reactants do not result in the formation of polymeric substances and the process is therefore economically and commercially practical.

In carrying out the novel process of this invention, it is preferred that the aqueous alkaline medium be composed of a water solution of sodium hydroxide or potassium hydroxide. Other alkaline agents may be used. An operable range of concentration of the preferred alkaline agents in the reaction medium is from 2% to 10% by weight of solution while the preferred range of concentration is from 3% to 8% by weight of solution. Higher or lower concentrations of the alkaline agent tend to decrease the yield of quinoxaline. The operable and preferred ranges of concentrations of alkaline agents other than the preferred alkaline agents may necessarily vary slightly due to a variation in the degree of alkalinity of the alkaline agent per se.

The quantity of aqueous alkaline medium utilized in the process is governed by the initial acidity of the glyoxal and any additional acidity which might be developed during the reaction. Sufficient quantities of the alkaline medium are used to maintain an alkaline reaction mixture initially and throughout the reaction period. The quantity of reaction medium, therefore, necessarily varies from batch to batch of reaction mixture as the initial acidity of the glyoxal varies and the acidity developed during reaction varies dependent upon reaction conditions. Since the initial acidity of glyoxal and the acidity of reaction is relatively low, large concentrations of reactants, in the order of 40 to 50% by weight of reaction mixture, may be utilized thereby greatly increasing the unit capacity of the equipment used in the process.

In the novel process of this invention, it is preferred that approximately 1 to 1.15 mols of glyoxal be used per mole of o-phenylene diamine. Larger amounts of glyoxal do not increase the yield of quinoxaline. The reaction may be carried out at a temperature in the range of 30° to 100° C. and the preferred temperature range is 40° to 70° C.

The quinoxaline obtained in the reaction may be separated from the reaction mixture and purified according to any of the conventional methods, for example, it may be extracted with ether, benzene or chlorobenzene and subsequently purified by distillation.

The following example is illustrative of the novel process of the applicant's invention:

To 54 grams of o-phenylene diamine (0.5 mol) contained as a suspension in 100 ml. of a 5% sodium hydroxide solution, was added while stirring 105.6 grams of a 30.2% aqueous solution of glyoxal (0.55 mol). The temperature was maintained at 55° to 60° C. during the reaction. When the reaction was complete, the quinoxaline was extracted from the reaction mixture with chlorobenzene and the chlorobenzene extract distilled obtaining the quinoxaline in 91% yield having a melting point of 30° C.

The above mentioned process was repeated using potassium hydroxide as the alkaline agent in place of sodium hydroxide. Quinoxaline was obtained in substantially the same yield and purity.

I claim:

1. In the process for the production of quinoxaline, the step comprising reacting at a temperature in the range of approximately 30° to 100° C. one mol of ortho-phenylene diamine with approximately 1 to 1.15 mols of glyoxal in an inert aqueous alkaline medium, said medium being alkaline during the entire reaction.

2. In the process for the production of quinoxaline, the step comprising reacting at a temperature in the range of approximately 30° to 100° C. one mol of ortho-phenylene diamine with approximately 1 to 1.15 mols of glyoxal in an inert aqueous alkaline medium containing 2 to 10% by weight of sodium hydroxide, said medium being alkaline during the entire reaction.

3. In the process for the production of quinoxaline, the step comprising reacting at a temperature in the range of approximately 40° to 70° C. one mol of ortho-phenylene diamine with approximately 1 to 1.15 mols of glyoxal in an inert aqueous alkaline medium containing of 2 to 10% by weight of sodium hydroxide, said medium being alkaline during the entire reaction.

4. In the process for the production of quinoxaline, the step comprising reacting at a temperature in the range of approximately 40° to 70° C. one mol of ortho-phenylene diamine with approximately 1 to 1.15 mols of glyoxal in an inert aqueous alkaline medium containing 3 to 8% by weight of sodium hydroxide, said medium being alkaline during the entire reaction.

5. In the process for the production of quinoxaline, the step comprising reacting at a temperature in the range of approximately 40° to 70° C. one mol of ortho-phenylene diamine with approximately 1 to 1.15 mols of glyoxal in an inert aqueous alkaline medium containing 3 to 8% by weight of potassium hydroxide, said medium being alkaline during the entire reaction.

6. In the process for the production of quinoxaline, the step comprising reacting at a temperature in the range of approximately 30°–100° C., 1 mol of ortho-phenylene diamine with approximately 1 to 1.15 mols of glyoxal in an inert aqueous alkaline medium containing an alkali metal hydroxide, said medium being alkaline during the entire reaction.

7. In the process for the production of quinoxaline, the step comprising reacting at a temperature in the range of approximately 30°–100° C., 1 mol of ortho-phenylene diamine with approximately 1 to 1.15 mols of glyoxal in an inert aqueous alkaline medium containing 2–10% by weight of an alkali metal hydroxide, said medium being alkaline during the entire reaction.

MICHAEL N. DVORNIKOFF.

REFERENCES CITED

The following references are of record in the file of this patent:

Hinsberg, Liebigs Annalen, 237, 333–334 (1887).